(12) United States Patent
Lichun et al.

(10) Patent No.: US 11,302,341 B2
(45) Date of Patent: Apr. 12, 2022

(54) MICROPHONE ARRAY BASED PICKUP METHOD AND SYSTEM

(71) Applicant: YUTOU TECHNOLOGY (HANGZHOU) CO., LTD., Hangzhou (CN)

(72) Inventors: Fan Lichun, Hangzhou (CN); Zhu Lei, Hangzhou (CN); Gao Peng, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 53 days.

(21) Appl. No.: 16/476,259

(22) PCT Filed: Jan. 26, 2018

(86) PCT No.: PCT/CN2018/074304
§ 371 (c)(1),
(2) Date: Jul. 5, 2019

(87) PCT Pub. No.: WO2018/137704
PCT Pub. Date: Aug. 2, 2018

(65) Prior Publication Data
US 2019/0355375 A1    Nov. 21, 2019

(30) Foreign Application Priority Data
Jan. 26, 2017    (CN) .......................... 201710061599.3

(51) Int. Cl.
*G10L 21/0216* (2013.01)
*G10L 15/22* (2006.01)
*G10L 21/0364* (2013.01)

(52) U.S. Cl.
CPC .......... *G10L 21/0216* (2013.01); *G10L 15/22* (2013.01); *G10L 21/0364* (2013.01); *G10L 2021/02166* (2013.01)

(58) Field of Classification Search
CPC ................. G10L 21/0216; G10L 15/22; G10L 2021/02166; G10L 21/0364;
(Continued)

(56) References Cited

U.S. PATENT DOCUMENTS 8,885,815 B1 * 11/2014 Velusamy ............... H04M 9/08
379/406.03
9,532,131 B2 * 12/2016 Dusan .................. G10K 11/178
(Continued)

FOREIGN PATENT DOCUMENTS

| CN | 104488025 A | 4/2015 |
|---|---|---|
| CN | 204390479 U | 6/2015 |

(Continued)

OTHER PUBLICATIONS

PCT/CN2018/074304—International Search Report dated Apr. 25, 2018, 12 pages (2 pages of English translation).
(Continued)

*Primary Examiner* — Mohammad K Islam
(74) *Attorney, Agent, or Firm* — Getech Law LLC; Jun Ye

(57) ABSTRACT

The present invention relates to a microphone array based pickup method, comprising: performing voice activation detection using one channel voice signal among multichannel voice signals picked up and output by a microphone array, and determining if a voice activation signal occurs; locating the voice source by using the multichannel voice signals output by the microphone array to obtain the voice source locating direction; enhancing a voice signal in the voice source locating direction to obtain an enhanced voice
(Continued)

signal; conducting voice wakeup detection on the enhanced voice signal and determining if a voice wakeup is detected; picking up and outputting the multichannel voice signals by the microphone array; Step 6: processing the multichannel voice signals picked up by the microphone array into one channel enhanced voice, and outputting the one channel enhanced voice as a finally picked up voice.

10 Claims, 3 Drawing Sheets

(58) Field of Classification Search
CPC ............ G10L 21/0232; G10L 21/0316; G10L 2015/223; H04R 3/005; H04R 1/406
See application file for complete search history.

(56) References Cited

U.S. PATENT DOCUMENTS

| | | | | |
|---|---|---|---|---|
| 9,635,186 | B2* | 4/2017 | Pandey | H04M 3/568 |
| 9,870,775 | B2* | 1/2018 | Lee | G10L 15/32 |
| 9,978,390 | B2* | 5/2018 | Shih | G10L 21/0264 |
| 10,127,908 | B1* | 11/2018 | Deller | G10L 15/26 |
| 10,134,425 | B1* | 11/2018 | Johnson, Jr. | G10L 15/05 |
| 10,249,299 | B1* | 4/2019 | Hart | H04R 3/005 |
| 10,540,995 | B2* | 1/2020 | Shin | G10L 25/84 |
| 2002/0067835 | A1* | 6/2002 | Vatter | G01H 7/00 381/58 |
| 2004/0013038 | A1* | 1/2004 | Kajala | H04B 7/086 367/119 |
| 2007/0093714 | A1* | 4/2007 | Beaucoup | H04R 3/005 600/437 |
| 2010/0150364 | A1* | 6/2010 | Buck | H04M 9/082 381/66 |
| 2014/0314251 | A1* | 10/2014 | Rosea | H04R 1/406 381/92 |
| 2014/0376741 | A1* | 12/2014 | Kechichian | H04R 1/08 381/92 |
| 2015/0046157 | A1* | 2/2015 | Wolff | G10L 15/28 704/231 |
| 2015/0256928 | A1* | 9/2015 | Mizuno | G01S 15/325 381/56 |
| 2016/0071526 | A1* | 3/2016 | Wingate | G01S 3/802 704/233 |
| 2016/0261953 | A1* | 9/2016 | Aggarwal | H03G 3/32 |
| 2016/0323668 | A1* | 11/2016 | Abraham | H04R 1/406 |
| 2017/0134853 | A1* | 5/2017 | Beaty | H04R 3/005 |
| 2017/0188437 | A1* | 6/2017 | Banta | G10L 15/30 |
| 2017/0243576 | A1* | 8/2017 | Millington | G10L 15/30 |
| 2017/0278515 | A1* | 9/2017 | Lee | G06F 1/3287 |
| 2017/0352349 | A1* | 12/2017 | Vrazic | G01S 3/801 |
| 2017/0353789 | A1* | 12/2017 | Kim | H04R 3/005 |
| 2018/0033447 | A1* | 2/2018 | Ramprashad | G10L 21/0216 |
| 2018/0115855 | A1* | 4/2018 | Bakish | H04S 3/008 |
| 2018/0253276 | A1* | 9/2018 | Kodama | H04R 3/12 |
| 2018/0268808 | A1* | 9/2018 | Song | G10L 15/28 |
| 2018/0330745 | A1* | 11/2018 | Ebenezer | G10L 19/005 |
| 2018/0366122 | A1* | 12/2018 | Lee | G06F 1/3206 |
| 2019/0096408 | A1* | 3/2019 | Li | H04R 3/005 |
| 2019/0103113 | A1* | 4/2019 | LaBosco | G10L 15/22 |
| 2019/0108837 | A1* | 4/2019 | Christoph | G10L 15/30 |
| 2019/0171413 | A1* | 6/2019 | Beatty | F21V 19/0015 |
| 2019/0221210 | A1* | 7/2019 | Song | G10L 21/02 |
| 2019/0349678 | A1* | 11/2019 | Janse | H04R 3/005 |
| 2020/0227067 | A1* | 7/2020 | Chen | G09B 21/009 |

FOREIGN PATENT DOCUMENTS

| | | |
|---|---|---|
| CN | 105280183 A | 1/2016 |
| CN | 106024003 A | 10/2016 |
| CN | 106098075 A | 11/2016 |
| CN | 106155621 A | 11/2016 |
| CN | 106782585 A | 5/2017 |

OTHER PUBLICATIONS

CN201710061599.3—First Office Action, dated Apr. 25, 2018, with English Translation, 6 pages.
PCT/CN2018/074304—International Search Report, dated Apr. 25, 2018, with English translation, 12 pages.

* cited by examiner

MICROPHONE ARRAY BASED PICKUP METHOD AND SYSTEM

TECHNICAL FIELD

The present invention relates to the signal processing field, and more particularly, to a microphone array based pickup method and system.

BACKGROUND

The recording of high-quality voice signals is of vital importance to voice analysis solutions including voice recognition. The traditional practice of single microphone recording would lead to the sharp reduction in the recording quality at a long distance and in high noise, which greatly limits the application of voice analysis methods. Thus, for voice input, voice search and other applications on a mobile phone, the speaker must be close enough to the microphone of the mobile phone. The pickup environment is classified as near-field pickup.

Microphone array recording can adopt multichannel voice signal data for post processing so as to control noise and enhance target voice signals. Therefore, microphone array becomes a necessary pickup device in far-field pickup. The general steps of pickup by microphone array include: Step 1, determining the position of the speaker; Step 2, enhancing voice signals using the beam-forming technology.

However, the above method has the following shortcomings in the practical applications: (1) Not all speakers speak at all moments and not the voices of all moments are required to be picked up. The problem can be easily solved by pressing the "Record" button in the near-field environment but hard to solved under the far-field environment; (2) it is hard to determine who the speaker that requires pickup is when multiple speakers are involved.

SUMMARY

In order to solve the above problems, the purpose of the present invention is to provide a microphone array based pickup method and system.

A microphone array based pickup method, comprising the following steps:

Step 1: performing voice activation detection using one channel voice signal among multichannel voice signals picked up and output by a microphone array, and determining if a voice activation signal occurs; if yes, go to Step 2; otherwise, repeat Step 1;

Step 2: locating the voice source by using the multichannel voice signals output by the microphone array to obtain the voice source locating direction;

Step 3: enhancing a voice signal in the voice source locating direction to obtain an enhanced voice signal;

Step 4: conducting voice wakeup detection on the enhanced voice signal and determining if a voice wakeup is detected; if yes, go to Step 5; otherwise, repeat Step 1;

Step 5: picking up and outputting the multichannel voice signals by the microphone array;

Step 6: processing the multichannel voice signals picked up by the microphone array into one channel enhanced voice, and outputting the one channel enhanced voice as a finally picked up voice.

The microphone array based pickup method of the present invention, wherein the Step 5 further comprises: lighting a pickup indicator lamp pointing to the voice source locating direction, while picking up and outputting the multichannel voice signals by the microphone array.

The microphone array based pickup method of the present invention, wherein the Step 1 further comprises:

Step 11: selecting one channel voice signal from the multichannel voice signals captured by the microphone array;

Step 12: detecting a voice initial point and a voice ending point of a speaker in the voice signals;

Step 13: determining if a voice activation signal occurs according to signals between the voice initial point and the voice ending point; if yes, go to Step 2; otherwise, repeat Step 1.

The microphone array based pickup method of the present invention, wherein locating the voice source in Step 2 further comprises:

determining the voice source locating direction by obtaining the location of the voice source according to the time difference of the signals received by at least two microphones in the microphone array.

The microphone array based pickup method of the present invention, wherein enhancing the voice signal in the Step 3 further comprises: suppressing the noise of the voice signal in the voice source locating direction to obtain an enhanced voice signal.

The microphone array based pickup method of the present invention, wherein the Step 4 further comprising: sending the enhanced voice signal into a signal wakeup model; detecting if pre-determined wakeup words are included in the enhanced voice signal; if yes, go to Step 1; otherwise, go to Step 5.

The microphone array based pickup method of the present invention, wherein the Step 6 further comprises enhancing the voice in the direction pointed by the pickup indicator lamp.

The microphone array based pickup method of the present invention, wherein at the same time of performing Step 6 after Step 5, further comprising performing Steps 1 to 5 based on the multichannel voice signals captured in the Step 5.

The present invention also provides a microphone array based pickup system, comprising:

a microphone array, including multiple microphone units, wherein the microphone units are configured to pick up and output multichannel voice signals;

a voice activation unit, connecting with the microphone array, conducts voice activation detection based on at least one channel voice signal among the multichannel voice signals to output voice activation signal or voice inactivation signal;

a voice source locating unit, connecting with the microphone array under the control of first controlled switch activated by the voice activation signal, determines voice source locating direction by locating the voice source according to the multichannel voice signals;

a first voice enhancement unit, connecting with the voice source locating unit, enhances the voice signal from the voice source locating direction to obtain an enhanced voice signal;

a voice wakeup detection unit, connecting with the first voice enhancement unit, performs voice wakeup detection on the enhanced voice signal and outputs a voice wakeup signal or a voice un-wakeup signal;

a second voice enhancement unit, connecting with the microphone array under the control of second controlled switch activated by the voice activation signal, processes the multichannel voice signals of the microphone array into an enhanced one channel voice and outputs the enhanced one channel voice as a finally picked up voice.

The microphone array based pickup system of the present invention, wherein the microphone array is of planar ring structure comprising multiple microphone units; multiple pickup indicator lamps are set along the encircling direction of the planar ring structure; the multiple pickup indicator lamps may point to different directions of the plane and be used to indicate the voice source locating direction.

Beneficiary effects: In response to the increasingly extensive applications of the current voice recognition technology in different contexts and under different demands, the present invention proposes a microphone array based pickup method and system so as to better pick up the voice signals in the far field environment, particularly in high noise, and to provide excellent solutions for far-distance voice control. Also, the present invention can reduce the computing workload in microphone array data processing through voice wakeup and voice detection so as to save both energy and costs.

DETAILED DESCRIPTION

Figure 1:
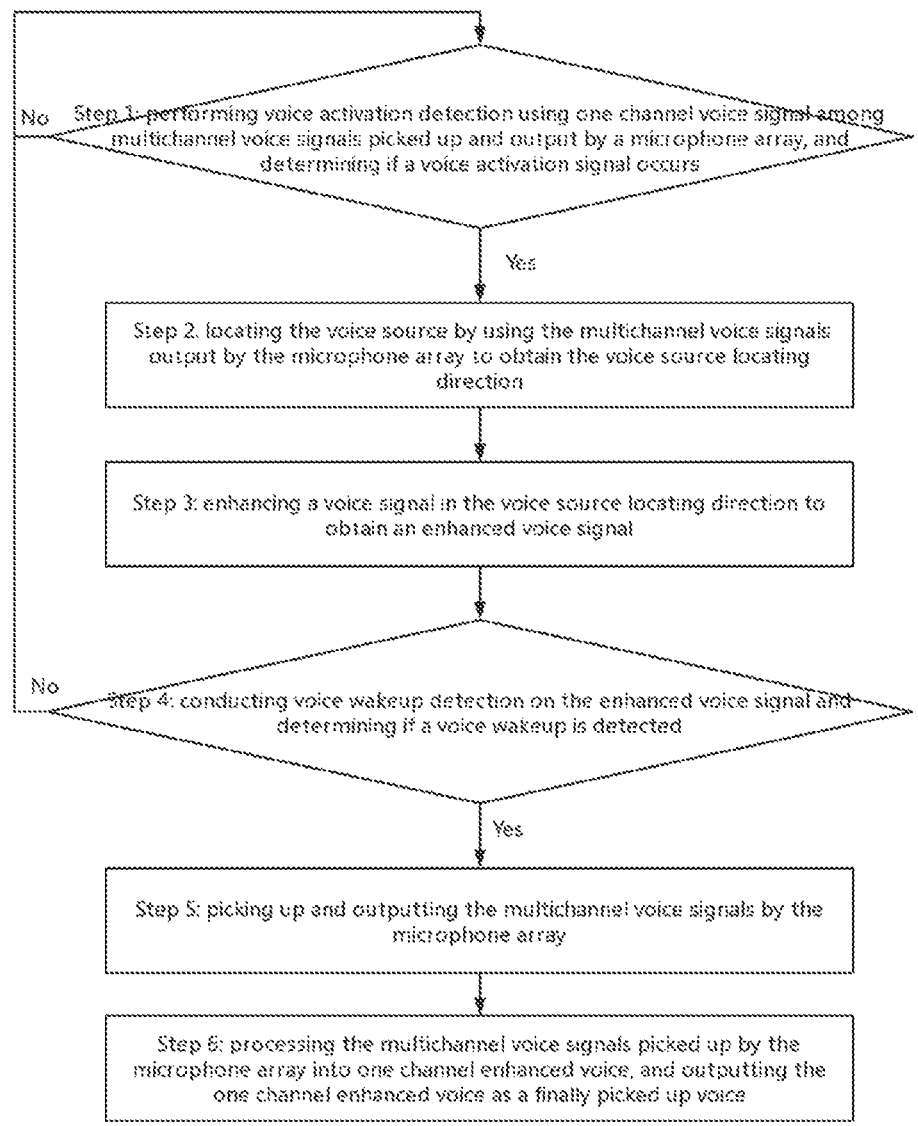
FIG. 1 shows the method flow chart of one embodiment of the present invention.
Figure 2:
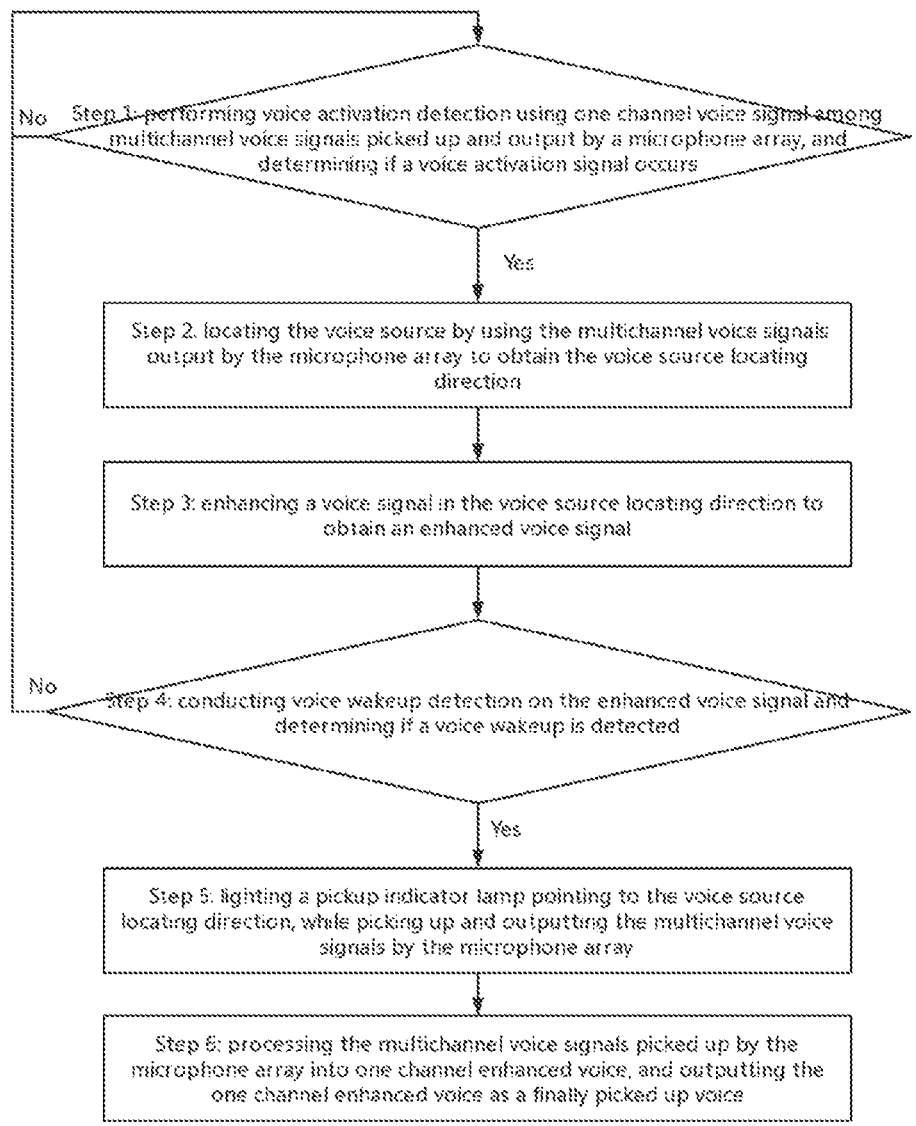
FIG. 2 shows the method flow chart of an alternative embodiment of the present invention.

The technical solutions of the embodiments of the present invention are clearly and completely described in combination with the figures of the embodiment of the present invention below. Obviously, the embodiments described are only part and not all embodiments of the present invention. Any other embodiments obtained when the person having ordinary skill in the art do not contribute their creative work fall into the protection scope of the present invention.

It is worth noticed that the embodiments of the invention and their elements may be combined without conflict.

The present invention is further described in reference with figures and embodiments but is not intended to limit the present invention.

A microphone array based pickup method, comprising the following steps:

Step 1: performing voice activation detection using one channel voice signal among multichannel voice signals picked up and output by a microphone array, and determining if a voice activation signal occurs; if yes, go to Step 2; otherwise, repeat Step 1.

Step 2: locating the voice source using the multichannel voice signals output by the microphone array to obtain the voice source locating direction;

Step 3: enhancing the voice signal in the voice source locating direction to obtain an enhanced voice signal;

Step 4: conducting voice wakeup detection on the enhanced voice signal and determining if a voice wakeup is detected; if yes, go to Step 5; otherwise, repeat Step 1;

Step 5: picking up and outputting the multichannel voice signals by the microphone array;

Step 6: processing the multichannel voice signals picked up by the microphone array into one channel enhanced voice, and outputting the one channel enhanced voice as a finally picked up voice.

In response to the increasingly extensive applications of the current voice recognition technology in different contexts and under different demands, the present invention determines the means by which voice is picked up through voice wakeup in order to make the device enter a status of pickup and then enhance the voice of the speaker. The invention can enable a better pickup of voice signals in the far-field environment, particularly accurate pickup in high noise.

As a preferred embodiment of the present invention, the Step 5 is described as follows: lighting a pickup indicator lamp pointing to the voice source locating direction and picking up and outputting the multichannel voice signals by the microphone array.

The pickup indicator lamp is used to remind the user of the current pickup direction, which facilitates voice interaction. Upon voice wakeup, the pickup indicator lamp will point to the direction of the voice source. If the direction is that of the user, the user will understand that the words he/she say will be picked up by the system; otherwise, the user will understand that he/she say will not be picked up by the system and then decide whether to repeat the wakeup process.

As a preferred embodiment of the present invention, Step 6 further comprises enhancing the voice in the direction pointed by the pickup indicator lamp.

This interaction method reminds the direction in which pickup and voice enhancement will occur so that the speaker will understand which direction pickup can occur when he/she sees the pickup indicator lamp points to himself/herself. If the indicator lamp points to any other direction or is not lit, wakeup words will be reused for voice wakeup. That provides a brief guidance on how to correctly and effectively operate the device.

The microphone array based pickup method of the present invention, the Step 1 further comprises:

Step 11: selecting one channel voice signal from multichannel voice signals captured by the microphone array;

Step 12: detecting a voice initial point and a voice ending point of the speaker in the voice signals;

Step 13: determining if a voice activation signal occurs according to the signals between the voice initial point and the voice ending point; if yes, go to Step 2; otherwise, repeat Step 1.

In the voice activation detection step, the voice initial point will be given when someone speaks and the voice ending point will be provided when the speech is finished. During the entire process, only one signal of any one channel of the microphone array is required for voice activation detection. The voice activation detection can be realized by using the voice activation method of the existing technology.

The microphone array based pickup method of the present invention, wherein locating the voice source in Step 2 further comprises: determining the voice source locating direction by obtaining the location of the voice source according to the time difference of the signals received by at least two microphones in the microphone array. The method for locating the voice source 1 can be realized by beamforming technology.

The microphone array based pickup method of the present invention, wherein enhancing the voice signal in Step 3 further comprises: suppressing the noise of the voice signal in the voice source locating direction to obtain an enhanced voice signal.

The voice enhancement through the microphone array can contribute to obtain voice signals of higher signal-to-voice ratio, thus achieving the goal of voice enhancement and facilitating the subsequent processing.

The microphone array based pickup method of the present invention, wherein the Step 4 further comprising: sending the enhanced voice signal into a signal wakeup model; detecting if pre-determined wakeup words are included in the enhanced voice signal; if yes, go to Step 1; otherwise, go to Step 5.

In Step 4, by detecting whether wakeup words are included in the voice signal, whether to enter into the wake-up status is determined. In the case of a failed wakeup, the system will not give a response, and will continue the activation detection to determine if any other voice enters. In the event of successful wakeup, the pickup indicator lamp will be lit and the following step will be performed.

In a preferred embodiment, at the same time of performing Step 6 after Step 5, further comprising performing Steps 1 to 5 based on the multichannel voice signals captured in the Step 5.

While picking up in the direction of pickup indicator lamp, the microphone array will record the voice of all directions for continuous recording. In one hand, the data will enter the pickup data flow for final pickup, in the other hand, the data will enter the cycle in the wakeup data flow. That aims to guarantee situations when the users in other directions also say activation words or when no pickup indicator lamp points to the direction of the users. In the case of successful wakeup, the pickup indicator lamp will shift to a new voice source direction and then the picked data flow will pick up voice in the new direction. At the same time, the wakeup data flow will still make a continuous determination in all directions.

The specific pickup process under a preferred embodiment is as follows: Detect voice activation by any one channel of signals of the microphone array. After detecting a voice activation signal, locating voice source by the microphone array Enhancing a voice signal in the voice source locating direction according to the locating result. Send the enhanced voice signal into a voice wakeup model for voice wakeup detection. After voice wakeup is detected, a pickup indicator lamp will be on and point to the direction of the voice source. Enhance the voice in the direction of the indicator lamp and conduct voice activation detection. Pick up the voice after detecting it. Finally, keep detecting the wakeup in the new direction while pick up voice. Once any new wakeup is detected, the pickup indicator lamp will point to the new wakeup direction and the steps will be repeated.

Figure 3:
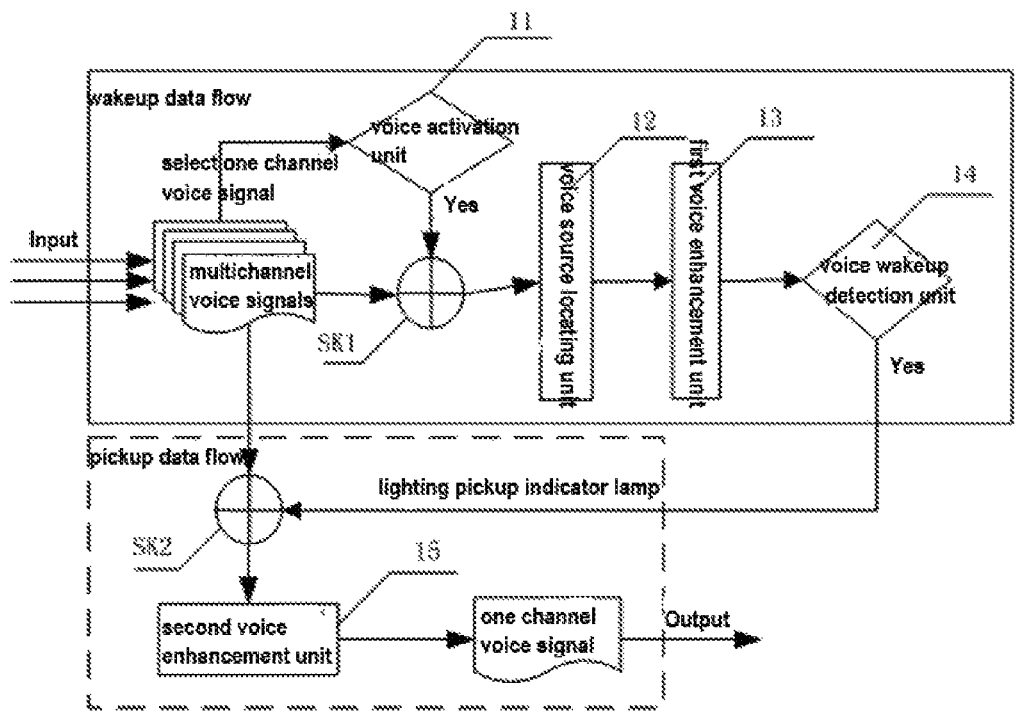
FIG. 3 shows the system structure chart of the present invention.

The present invention also provides a microphone array based pickup system, as referred to in FIG. 3, comprising:

a microphone array, including multiple microphone units, wherein the microphone units are configured to pick up and output multichannel voice signals;

a voice activation unit 11, connecting with the microphone array, conducts voice activation detection based on at least one channel voice signal among the multichannel voice signal to output voice activation signal or voice inactivation signal;

a voice source locating unit 12, connecting with the microphone array under the control of first controlled switch SK1 activated by the voice activation signal, determines the voice source locating direction by locating the voice source according to the multichannel voice signals;

a first voice enhancement unit 13, connecting with the voice source locating unit 12, enhances the voice signal from the voice source locating direction to obtain an enhanced voice signals.

a voice wakeup detection unit 14, connecting with the first voice enhancement unit 13, performs voice wakeup detection on the enhanced voice signal and outputs a voice wakeup signal or a voice un-wakeup signal;

a second voice enhancement unit 15, connecting with the microphone array under the control of second controlled switch SK2 activated by the voice activation signal, processes the multichannel voice signals of the microphone array into an enhanced one channel voice and outputs the enhanced one channel voice as finally picked up voice output.

Refer to FIG. 3. During the whole pickup process, there are two data flows, namely wakeup data flow and pickup data flow. The wakeup data flow runs at all times. However, these units do not work at all times. Only when the voice activation unit detects voice activation and the first controlled switch SK1 in FIG. 3, is opened, data will flow back to the voice source locating unit 12, the first enhancement unit 13 and the voice wakeup detecting unit 14. Usually, the voice source locating unit 12, the first voice enhancement unit 13 and the voice wakeup detection unit 14 do not work in most time, which can save more resources.

When voice wakeup triggers, the pickup indicator lamp will be on and point to the pickup direction. At this time, the second controlled switch SK2 in FIG. 3, will be on and the pickup data flow will start to work. When voice wakeup triggers a signal again, the pickup indicator lamp will point to a new direction and pick up voice in the new direction. The pickup data flow will be closed when there is no voice in the pickup data flow.

Figure 4:
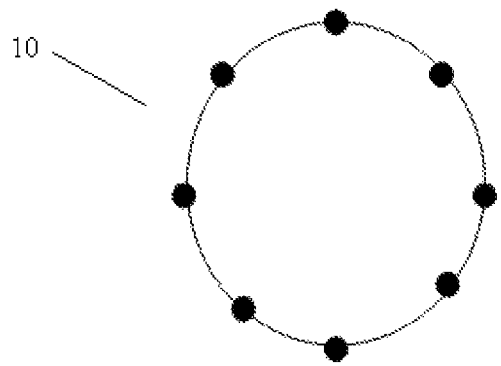
FIG. 4 shows the schematic diagram of the microphone array structure of the present invention.

In the microphone array based pickup system of the present invention, the microphone array can be of planar ring structure comprising multiple microphone units. Referring to FIG. 4. The microphone array includes 8 microphone units, which are of symmetrical construction, so that the signals in different directions can be equally treated and processed. Multiple pickup indicator lamps are set along the encircling direction of the planar ring structure. They may point to different directions of the plane and be used to indicate the voice source locating direction.

The above description are only the preferred embodiment of the present invention and is not intend to limit the embodiments of the invention and the scope of protection. The person skilled in the art should be aware that any solutions through equivalent substitution and obvious changes to the specification and figures of the present invention should be included in the protection scope of the present invention.

What is claimed is:

1. A microphone array based pickup method, comprising:
  performing, by a voice activation unit, voice activation detection using one channel voice signal among multichannel voice signals picked up and output by a microphone array;
  locating, by a voice source locating unit, the voice source by using the multichannel voice signals output by the microphone array to obtain the voice source locating direction based on a determination that a voice activation signal occurs;
  allowing, by a first controlled switch, when activated by the voice activation signal, the multichannel voice signals to pass to the voice source locating unit,
  enhancing, by a first voice enhancement unit, a voice signal in the voice source locating direction to obtain an enhanced voice signal;
  conducting, by a voice wakeup detection unit, voice wakeup detection on the enhanced voice signal;

based on a determination that a voice wakeup is detected, picking up and outputting, by the voice wakeup detection unit, a voice wakeup signal and the multichannel voice signals by the microphone array;

allowing, by a second controlled switch, when activated by the voice wakeup signal, the multichannel voice signals to pass to a second voice enhancement unit; and processing, by the second voice enhancement unit, the multichannel voice signals picked up by the microphone array into one channel enhanced voice, and outputting the one channel enhanced voice as a finally picked up voice.

2. The microphone array based pickup method of claim 1, wherein the picking up and outputting comprises: lighting a pickup indicator lamp pointing to the voice source locating direction, while picking up and outputting the multichannel voice signals by the microphone array.

3. The microphone array based pickup method of claim 1, wherein the performing voice activation detection further comprises:

selecting one channel voice signal from the multichannel voice signals captured by the microphone array;

detecting a voice initial point and a voice ending point of a speaker in the voice signals;

determining if a voice activation signal occurs according to signals between the voice initial point and the voice ending point.

4. The microphone array based pickup method of claim 1, wherein locating the voice source further comprises:

determining the voice source locating direction by obtaining the location of the voice source according to the time difference of the signals received by at least two microphones in the microphone array.

5. The microphone array based pickup method of claim 1, wherein the enhancing the voice signal further comprises:

suppressing the noise of the voice signal in the voice source locating direction to obtain an enhanced voice signal.

6. The microphone array based pickup method of claim 1, wherein the conducting voice wakeup detection further comprising:

sending the enhanced voice signal into a signal wakeup model; detecting if pre-determined wakeup words are included in the enhanced voice signal.

7. The microphone array based pickup method of claim 2, wherein the processing the multichannel voice signals further comprises:

enhancing the voice in the direction pointed by the pickup indicator lamp.

8. The microphone array based pickup method of claim 1, further comprising:

performing the voice activation detection based on the multichannel voice signals captured by the microphone array when the wakeup is detected; and performing the processing the multichannel voice signals picked up by the microphone array into one channel enhanced voice.

9. A microphone array based pickup system, comprising:

a microphone array, including multiple microphone units, wherein the microphone units are configured to pick up and output multichannel voice signals;

a voice activation unit, connecting with the microphone array, conducts voice activation detection based on at least one channel voice signal among the multichannel voice signals to output voice activation signal or voice inactivation signal;

a voice source locating unit, connecting with the microphone array under the control of first controlled switch activated by the voice activation signal, determines voice source locating direction by locating the voice source according to the multichannel voice signals, wherein the first controlled switch, when activated, allows the multichannel voice signals to pass to the voice source locating unit;

a first voice enhancement unit, connecting with the voice source locating unit, enhances the voice signal from the voice source locating direction to obtain an enhanced voice signal;

a voice wakeup detection unit, connecting with the first voice enhancement unit, performs voice wakeup detection on the enhanced voice signal and outputs a voice wakeup signal or a voice un-wakeup signal;

a second voice enhancement unit, connecting with the microphone array under the control of second controlled switch activated by the voice wakeup signal, processes the multichannel voice signals of the microphone array into an enhanced one channel voice and outputs the enhanced one channel voice as a finally picked up voice, wherein the second controlled switch, when activated, allows the multichannel voice signals to pass to the second voice enhancement unit.

10. The microphone array based pickup system of claim 9, wherein the microphone array is of planar ring structure comprising multiple microphone units; multiple pickup indicator lamps are set along the encircling direction of the planar ring structure; the multiple pickup indicator lamps are configured to indicate the voice source locating direction.

* * * * *